United States Patent [19]

Figueroa

[11] Patent Number: 5,367,570
[45] Date of Patent: Nov. 22, 1994

[54] DUAL TELEPHONE

[76] Inventor: Hector D. Figueroa, 14-10 New Haven Ave., Far Rockaway, N.Y. 11691

[21] Appl. No.: 81,227

[22] Filed: Jun. 25, 1993

[51] Int. Cl.$^5$ .............................................. H04M 1/00
[52] U.S. Cl. ................................... 379/434; 379/433; 379/428; 379/454
[58] Field of Search ............... 379/428, 433, 429, 449, 379/454, 443, 434

[56] References Cited

U.S. PATENT DOCUMENTS

| | | | |
|---|---|---|---|
| 1,903,565 | 4/1933 | Vartanian | 379/454 |
| 2,874,229 | 2/1959 | Lilley | 379/433 |
| 3,141,072 | 7/1964 | Neilson | 379/449 |
| 4,107,477 | 8/1978 | Morrison | 379/428 |
| 5,134,649 | 7/1992 | Gutzmer | 379/443 |

Primary Examiner—James L. Dwyer
Assistant Examiner—Jack Chiang
Attorney, Agent, or Firm—Hugh E. Smith

[57] ABSTRACT

A dual phone arrangement allowing two persons to simultaneously listen and talk during the same telephone conversation which includes a pair of telephones connected back-to-back each having a receiver and a transmitter; electrical wires connecting each telephone to each other and to an external telephone line and dialing instrument; and a tubular member interposed between said pair of telephones to provide support for the same on an external stand which may be a shoulder support or a free-standing unit.

3 Claims, 3 Drawing Sheets

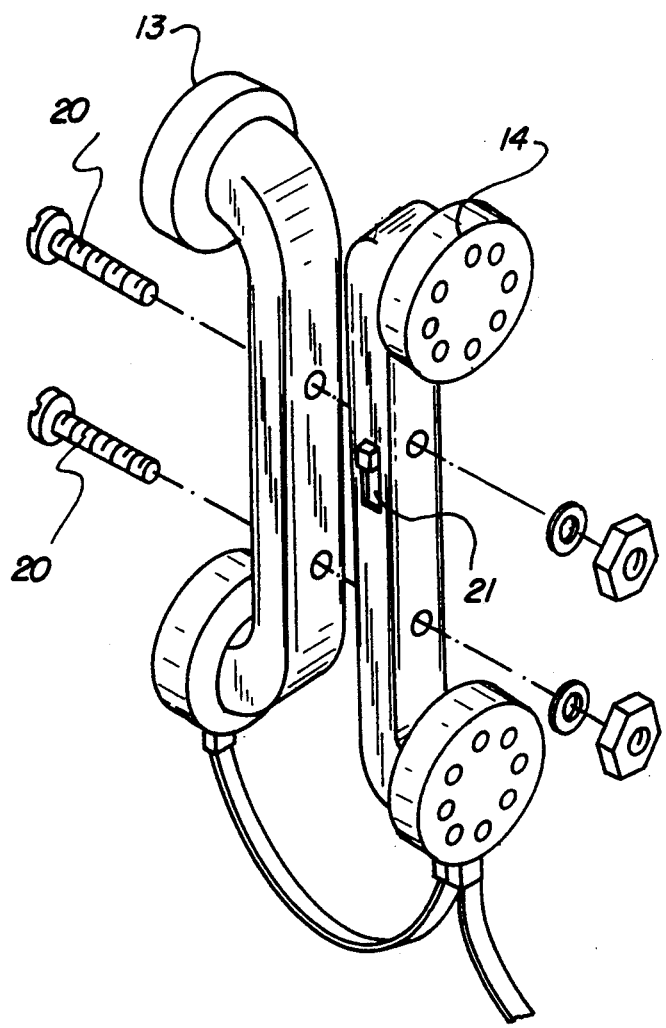
Fig. 3
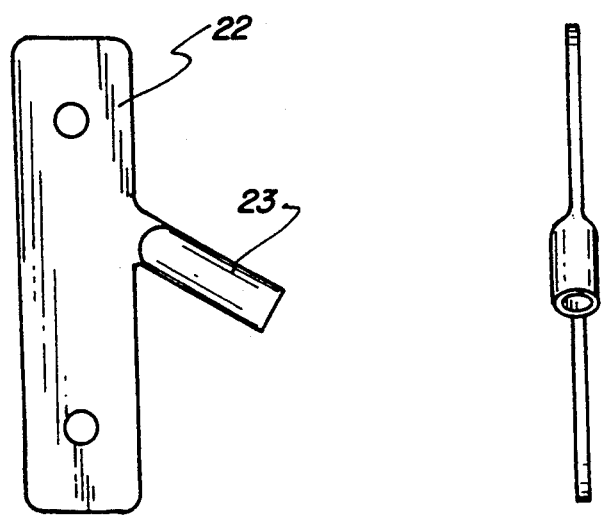
Fig. 4
Fig. 5

DUAL TELEPHONE

BACKGROUND OF THE INVENTION

1. Field of the Invention

The present invention relates to telephones and more particularly pertains to a telephone arrangement which may be utilized by more than one person at a time.

2. Description of the Prior Art

The use of telephones and speaker phones is known in the prior art. More specifically, telephones heretofore devised and utilized for the purpose of multiple listeners or speakers are known to consist basically of familiar, expected and obvious structural configurations, notwithstanding the myriad of designs encompassed by the crowded prior art which have been developed for the fulfillment of countless objectives and requirements. Such devices lack all privacy as to the incoming telephone call since it is amplified and audible to any within earshot. Typical prior art devices are shown in U.S. Pat. Nos. 5,099,514; 4,944,698; 5,059,141; 3,830,987; and 4,926,474.

In this respect, the dual telephone according to the present invention substantially departs from the conventional concepts and designs of the prior art, and in so doing provides an apparatus primarily developed for the purpose of permitting more than one user to use a telephone at the same time with the privacy of a single phone.

Therefore, it can be appreciated that there exists a continuing need for new and improved telephone arrangement which can be used by more than one person simultaneously. In this regard, the present invention substantially fulfills this need.

SUMMARY OF THE INVENTION

In view of the foregoing disadvantages inherent in the known types of telephones now present in the prior art, the present invention provides an improved telephone construction wherein the same can be utilized by more than one person at a time. As such, the general purpose of the present invention, which will be described subsequently in greater detail, is to provide a new and improved telephone apparatus and method which has all the advantages of the prior art telephones and none of the disadvantages.

To attain this, the present invention essentially comprises a dual phone arrangement allowing two persons to simultaneously listen and talk during the same telephone conversation which comprises a pair of telephones connected back-to-back each having a receiver and a transmitter; electrical means connecting each telephone to each other and to an external telephone line and dialing instrument; and means interposed between said pair of telephones to provide support for the same on an external stand (which may be a shoulder support or a free-standing unit).

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved telephone which has all the advantages of the prior art telephones and none of the disadvantages.

It is another object of the present invention to provide a new and improved dual telephone which may be easily and efficiently manufactured and marketed.

It is a further object of the present invention to provide a new and improved dual telephone which is of a durable and reliable construction.

An even further object of the present invention is to provide a new and improved dual telephone which is susceptible of a low cost of manufacture with regard to both materials and labor, and which accordingly is then susceptible of low prices of sale to the consuming public, thereby making such telephones economically available to the buying public.

Still yet another object of the present invention is to provide a new and improved dual telephone which provides in the apparatuses and methods of the prior art some of the advantages thereof, while simultaneously overcoming some of the disadvantages normally associated therewith.

Still another object of the present invention is to provide a new and improved multiple user telephone which retains the privacy of the conventional regular telephone.

Yet another object of the present invention is to provide a new and improved telephone arrangement wherein two people can utilize a telephone at the same location simultaneously.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view showing the assembly of the device of the present invention.

FIG. 4 is a side perspective view of the holder component of the present invention.

FIG. 5 is a front perspective view of the holder of FIG. 4.

DESCRIPTION OF THE PREFERRED EMBODIMENT

Figure 2:
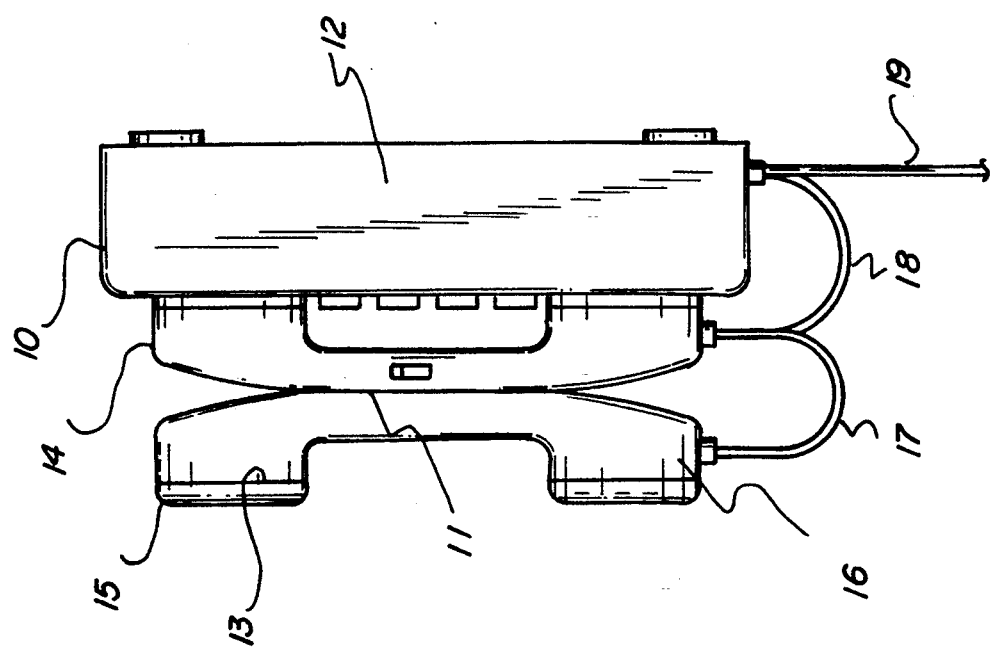
FIG. 2 is a side plan view of the device of FIG. 1.
Figure 1:
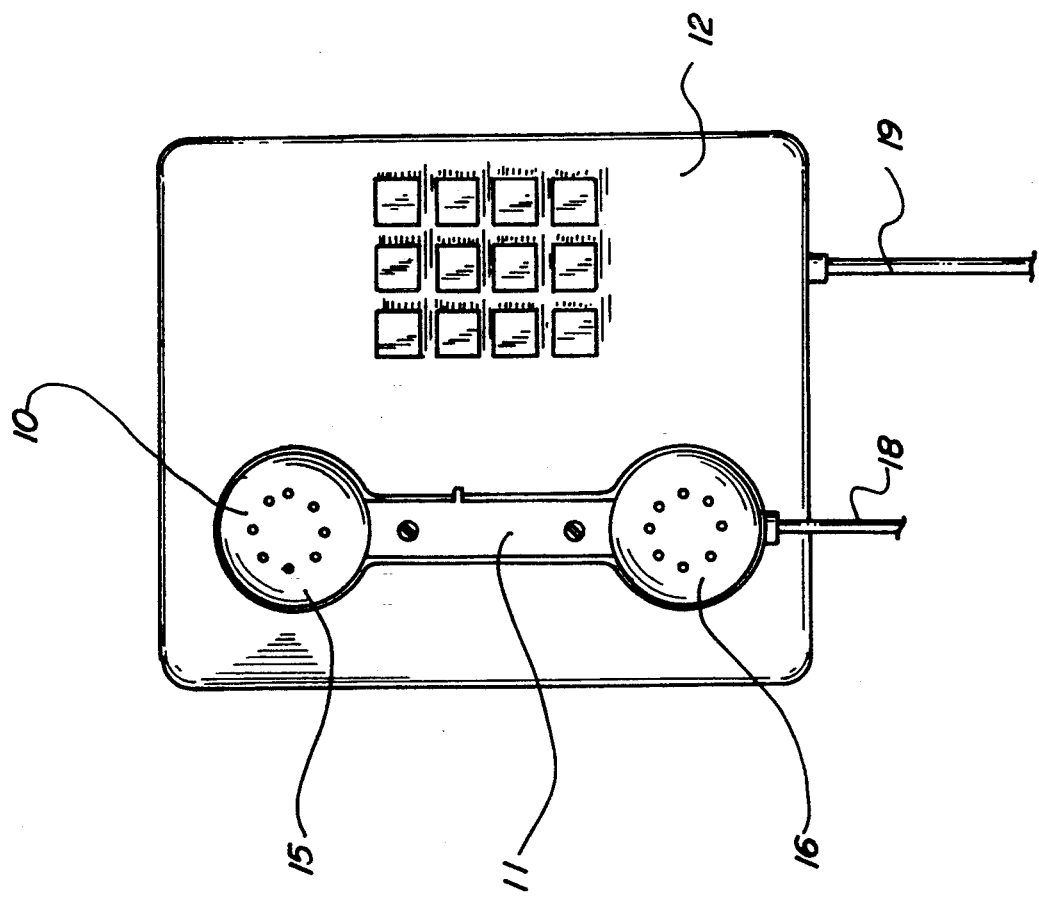
FIG. 1 is a front plan view of the device of the present invention.

With reference now to the drawings, and in particular to FIG. 1 and 2 thereof, a new and improved telephone arrangement embodying the principles and concepts of the present invention and generally designated by the reference numeral 10 will be described.

More specifically, it will be noted that the dual telephone 11 of the present invention readily mounts in a conventional cradle telephone holder 12 (here shown as a wall-mount unit). The device 10 consists of a pair of telephone instruments 13 and 14 each having an ear piece receiver 15 and a voice transmitter 16. The pair of instruments 13 and 14 are interconnected electrically by a telephone wire 17 and also to the external line and dialing system of cradle holder 12 by telephone lines 18 and 19 respectively.

As shown in FIG. 3, the instrument 13 and 14 are secured to each other in back-to-back relationship by a pair of fastening bolts and nuts 20. Also shown in this drawing and in FIG. 2, one of the instruments 14 has an electrical switch 21 thereon which will cut that instrument in or out of the circuit as desired.

Figure 6:
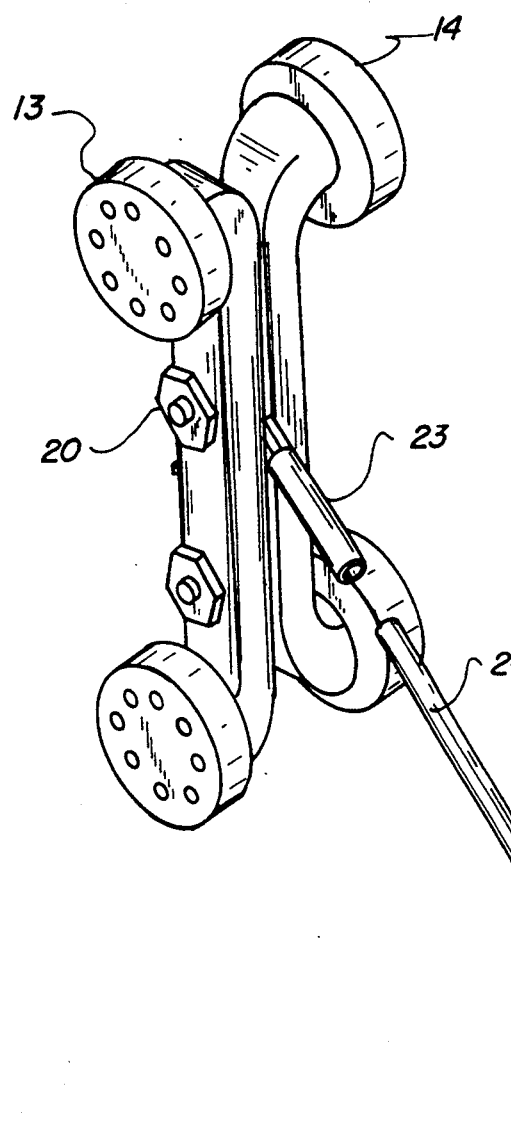
FIG. 6 is a perspective view of the mounting of the device of the present invention on a free-standing support stand.

FIGS. 4 and 5 illustrate a flat mounting bracket 22 having holes therein which align with the holes for bolts 20 in FIG. 3. Bracket 22 is interposed between instrument 13 and 14 and secured thereto by said bolts 20. Extending from the front of bracket 22 is a tubular receptacle member 23. As shown in FIG. 6, such tubular receptacle member 23 is adapted to receive a tubular support strut 24 which may be affixed to a free-standing support stand 25 as in FIG. 6.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A dual telephone which allows two persons to simultaneously listen and talk without an incoming conversation being overheard by a third party, said telephone comprising:

a first telephone instrument having a center portion, a forward surface, a rearward surface, and a plurality of apertures extending through said center portion thereof, with a ear piece receiver and a voice transmitter positioned upon said forward surface of said first instrument thereof;

a second telephone instrument having a center portion, a forward surface, a rearward surface, and a plurality of apertures extending through said center portion thereof, with a ear piece receiver and a voice transmitter positioned upon said forward surface of said second instrument thereof;

a plurality of threaded fasteners, with each of said fasteners passing through a respective one of said apertures of both said first and second instruments to relasably couple said rearward surface of said first telephone instrument to said rearward surface of said second telephone instrument such that said forward surfaces of said instruments are facing in opposed directions;

a telephone wire providing electrical communication between said telephone instruments; and a switch mounted within said second instrument center portion and projecting through a further aperture in said second instrument center portion, said switch being in electrical communication with said telephone wire for selectively permitting and precluding electrical communication between said first and said second instruments, whereby said switch is positioned along said second instrument center portion so as to be operable by either of said persons to effect selective operation of said second instrument.

2. The dual telephone as recited in claim 1, and further comprising a flat mounting bracket having holes therein aligned with said center portion apertures, said bracket being interposed between said instruments with said threaded fasteners extending through said holes to secure said mounting bracket between said rearward surfaces of said instruments, said bracket further having a tubular receptacle member extending from said mounting bracket for engaging a supporting means for supporting said instruments relative to a surface, whereby said bracket and said instruments are supported above said surface by said supporting means.

3. The dual telephone as recited in claim 2, wherein said supporting means comprises a free-standing support stand.

* * * * *